United States Patent
Finn et al.

(10) Patent No.: US 10,508,590 B2
(45) Date of Patent: Dec. 17, 2019

(54) FORCED INDUCTION ENGINE WITH ELECTRIC MOTOR FOR COMPRESSOR

(71) Applicant: Kohler Co., Kohler, WI (US)

(72) Inventors: Bryan Finn, Cascade, WI (US); Billy Brandenburg, Horicon, WI (US); Joshua Salley, Cato, WI (US); Pezaan S. Patrawala, Roseville, MN (US)

(73) Assignee: Kohler Co., Kohler, WI (US)

( * ) Notice: Subject to any disclaimer, the term of this patent is extended or adjusted under 35 U.S.C. 154(b) by 284 days.

(21) Appl. No.: 15/426,781

(22) Filed: Feb. 7, 2017

(65) Prior Publication Data

US 2018/0223724 A1    Aug. 9, 2018

(51) Int. Cl.
*F02B 39/10*   (2006.01)
*F02B 29/06*   (2006.01)
(Continued)

(52) U.S. Cl.
CPC .......... *F02B 33/40* (2013.01); *F02B 29/0406* (2013.01); *F02M 35/10157* (2013.01);
(Continued)

(58) Field of Classification Search
CPC ...... F02B 39/10; F02B 33/40; F02B 29/0406; F02B 63/04; F02D 41/0007; F02D 23/00;
(Continued)

(56) References Cited

U.S. PATENT DOCUMENTS 5,400,596 A * 3/1995 Shlien ...................... F02G 5/02
60/597
5,605,045 A   2/1997 Halimi et al.
(Continued)

FOREIGN PATENT DOCUMENTS

AU   2013101712 A4   2/2015
EP      1460248 B1   11/2005
(Continued)

OTHER PUBLICATIONS

Rodman, S., et al. "Improvement of the dynamic characteristic of an automotive engine by a turbocharger assisted by an electric motor." Journal of Engineering for Gas Turbines and Power; 125(2): 590-595. Apr. 29, 2003.

*Primary Examiner* — Thai Ba Trieu
(74) *Attorney, Agent, or Firm* — Lempia Summerfield Katz LLC

(57) ABSTRACT

A generator system may include a compressor and an electric motor. The compressor includes an impeller, and the compressor provides a quantity of air flowing toward an intake of an engine through rotation of the impeller. The electric motor is mechanically linked to the compressor and rotates the impeller to force the quantity of air flowing toward the intake of the engine. The generator system may include a charge air cooler to receive the quantity of air flowing toward the intake of the engine and increase an air charge density of the quantity of air. The generator system may include an exhaust portion to expel exhaust from the engine such that the quantity of air provided by the compressor does not include exhaust expelled by the exhaust portion. The generator system may include an air valve configured to regulate the quantity of air flowing toward the intake of the engine.

14 Claims, 10 Drawing Sheets

(51) Int. Cl.
*F02D 41/00* (2006.01)
*F02B 33/40* (2006.01)
*F02B 29/04* (2006.01)
*F02M 35/10* (2006.01)
*F02B 63/04* (2006.01)
*F02D 23/00* (2006.01)

(52) U.S. Cl.
CPC ....... *F02M 35/10255* (2013.01); *F02B 63/04* (2013.01); *F02D 23/00* (2013.01)

(58) Field of Classification Search
CPC .............. F02D 29/06; F02M 35/10157; F02M 35/10255; Y02T 10/144; Y02T 10/146
USPC ........................................ 60/607–608; 290/52
See application file for complete search history.

(56) References Cited

U.S. PATENT DOCUMENTS

| | | | |
|---|---|---|---|
| 5,741,123 A | 4/1998 | Pauly | |
| 5,771,695 A | 6/1998 | Halimi | |
| 5,906,098 A | 5/1999 | Woollenweber et al. | |
| 6,415,606 B1* | 7/2002 | Bowman | F02B 39/10 60/608 |
| 6,559,551 B2* | 5/2003 | Graage | B60K 6/32 290/52 |
| 6,609,375 B2 | 8/2003 | Allen et al. | |
| 6,718,955 B1 | 4/2004 | Knight | |
| 6,735,945 B1 | 5/2004 | Hall et al. | |
| 7,076,954 B1* | 7/2006 | Sopko, Jr. | F02B 39/10 60/608 |
| 7,174,714 B2* | 2/2007 | Algrain | F02D 23/00 290/52 |
| 7,322,202 B2 | 1/2008 | Zywiak et al. | |
| 7,352,077 B2 | 4/2008 | Shibui et al. | |
| 7,367,190 B2 | 5/2008 | Shibui et al. | |
| 8,371,121 B2 | 2/2013 | Godeke et al. | |
| 8,555,639 B2* | 10/2013 | Watanabe | F02B 39/10 60/608 |
| 8,584,459 B2* | 11/2013 | Richards | F02B 39/10 60/608 |
| 8,991,172 B2* | 3/2015 | Shimizu | F02B 39/10 60/608 |
| 9,752,496 B2* | 9/2017 | Johnson | F02B 39/10 |
| 2002/0041813 A1 | 4/2002 | Fledersbacher et al. | |
| 2003/0188533 A1* | 10/2003 | Jaster | F02B 39/10 60/608 |
| 2003/0223892 A1 | 12/2003 | Woollenweber | |
| 2006/0207252 A1* | 9/2006 | Isobe | F02D 41/0007 60/601 |
| 2007/0034195 A1* | 2/2007 | Wijk | F02B 39/10 123/559.1 |
| 2007/0144175 A1* | 6/2007 | Sopko, Jr. | F02B 39/10 60/605.1 |
| 2009/0107142 A1* | 4/2009 | Russell | F02B 39/10 60/608 |
| 2009/0291803 A1 | 11/2009 | Moeller | |
| 2013/0074495 A1* | 3/2013 | Chi | F02B 39/10 60/608 |
| 2014/0013742 A1* | 1/2014 | Mizuno | F02B 39/10 60/607 |
| 2015/0267707 A1 | 9/2015 | Hoshino et al. | |
| 2016/0017793 A1* | 1/2016 | Johnson | F02B 39/10 417/44.1 |
| 2016/0076438 A1* | 3/2016 | Tabata | F02B 39/10 60/602 |
| 2016/0138466 A1* | 5/2016 | Ge | F02B 63/04 60/624 |
| 2016/0281652 A1* | 9/2016 | Takasu | F02D 41/0007 |
| 2016/0333842 A1* | 11/2016 | Sunley | F02D 41/062 |
| 2017/0145906 A1* | 5/2017 | Tomita | F02D 41/0007 |
| 2018/0142611 A1* | 5/2018 | Fuso | F02B 39/10 |

FOREIGN PATENT DOCUMENTS

| | | | |
|---|---|---|---|
| JP | 2007047934 A | | 2/2007 |
| JP | 2013132920 A | * | 7/2013 |
| WO | WO0032917 A1 | | 6/2000 |

\* cited by examiner

FORCED INDUCTION ENGINE WITH ELECTRIC MOTOR FOR COMPRESSOR

TECHNICAL FIELD

This disclosure relates in general to a forced induction device that increases the flow of air into the combustion chamber of an engine, which allows more fuel into the combustion chamber, improving efficiency and/or output of the engine, and more specifically, this disclosure includes an electric motor for driving the forced induction device.

BACKGROUND

A mixture of fuel and air are ignited in a combustion chamber of an engine. The amount of fuel that combusts is limited by the amount of air. Naturally aspirated engines, those engines that rely on atmospheric pressure to allow air into the engine, may be limited in the amount of air that enters the combustion chamber. Various techniques are available for increasing the amount of air that enters the combustion chamber and the resulting amount of fuel that flows into the combustion chamber of the engine and combusts, which increases the output of the engine.

A turbocharger forces more air into the combustion chamber of an engine, which increases the amount of fuel in the combustion chamber. Turbochargers suffer from a variety of limitations. Turbochargers are driven by a turbine that is rotated by the exhaust of the engine. Therefore, the speed of the turbocharger and the output of the turbocharger is limited by the operation of the engine. In addition, the turbocharger lags the engine because of the delay in time between an increase in the throttle of the engine and the increase in exhaust air from the engine.

BRIEF DESCRIPTION OF THE DRAWINGS

Exemplary implementations are described herein with reference to the following drawings.

DETAILED DESCRIPTION

The following embodiments describe a device including an electric motor for a forced induction engine. The engine may be included in an engine-generator set (genset). The electric motor may turn a compressor to force air into the engine. The device including the electric motor may be a substitute or an alternative for a turbocharger in the engine. The electric motor may be supplied power from the genset or from a battery. The electric motor may be operated by a controller in some examples, and in other examples the electric motor is always running or runs according to a predetermined time or following a schedule. In some examples, the device also includes an air valve that selectively provides the air expelled from the electric motor to the engine or to another location, such as the engine compartment.

Figure 1:
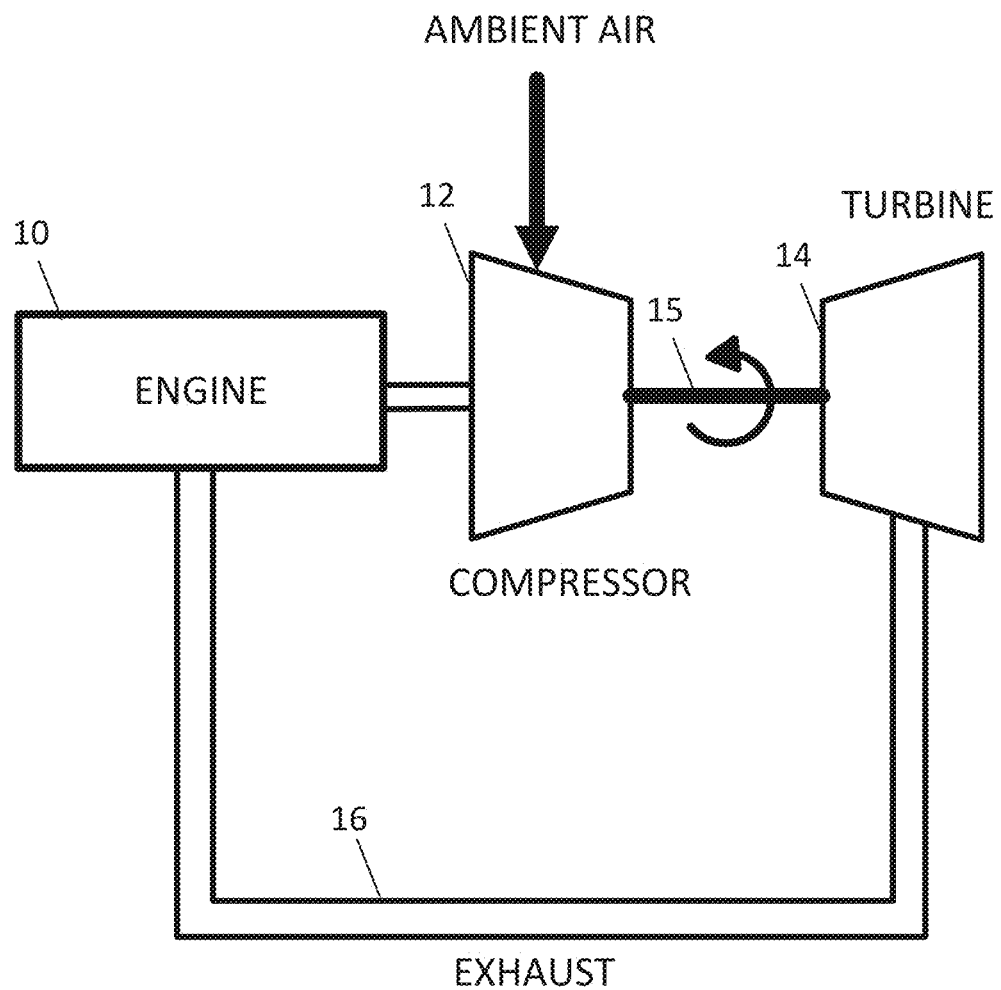
FIG. 1 illustrates an example of a turbocharger and an internal combustion engine.

FIG. 1 illustrates an example engine 10 including a turbocharger. The turbocharger includes a compressor 12 and a turbine 14. Air exiting the engine 10 travels through an exhaust path 16. Additional, different, or fewer components may be included.

A normally aspirated engine draws air into the combustion chamber through vacuum pressure created by a low pressure area caused by the downward stroke of the piston of the engine. The engine's volumetric efficiency is limited by the vacuum pressure and the geometric dimensions of the low pressure area. The number of oscillations of the piston and corresponding amount of air that can be naturally aspirated into the engine are constant with respect to the revolutions of the engine and cannot be increased because the geometry of the engine does not change. The turbocharger increases the amount of air received by the combustion chamber for each revolution of the engine. The turbocharger increases the density of the air by increasing the pressure of the air.

The turbine 14 spins under the force of exhaust air. The energy from the spinning turbine 14 is transferred along a common shaft 15 to the compressor 12. The pressure of the air is increased by compressor 12 before it is released into the intake manifold of the engine, increases the amount of fuel that is combusted in the engine and the power output of the engine. Examples described herein may not include a turbine. That is, when an exhaust passage is included, no turbine is included in the exhaust passage. Alternatively, the exhaust passage may diffuse internally in a compartment or housing including the engine.

Figure 2:
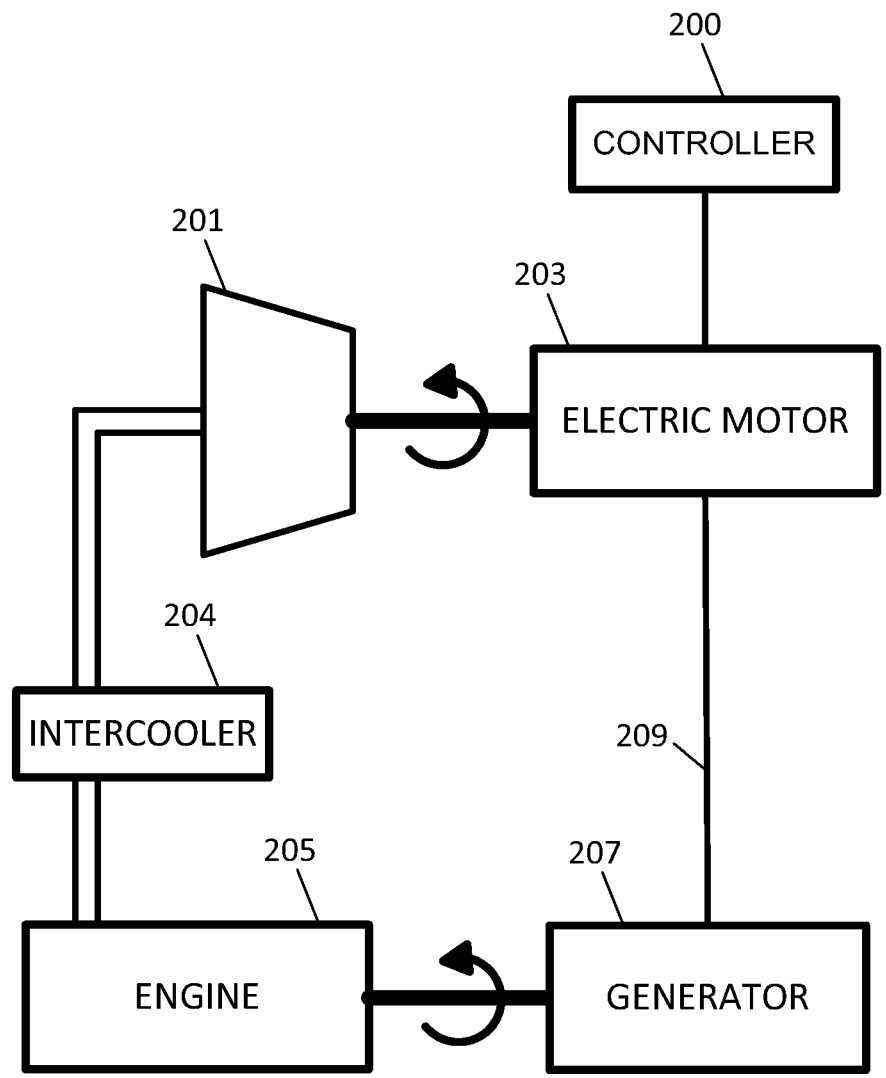
FIG. 2 illustrates the internal combustion engine with an example of an electric motor assisted compressor and being powered by a generator.

FIG. 2 illustrates an example system for controlled forced air into a combustion cycle without a turbocharger. The system includes a controller 200, a compressor 201, an electric motor 203, an intercooler 204 an engine 205, and a generator 207. The intercooler 204 may be omitted, and additional, fewer, or different components may be included in the system.

The electric motor 203 may be a direct current (DC) motor that converts electrical energy to mechanical energy in the rotation of a shaft. The DC motor may be powered by a battery or a rectified alternating current (AC) power source. Alternatively, an AC motor directly powered by an AC power source may be included as the electric motor 203. The electric motor 203 may include one or more windings that conduct electricity and either create a magnetic field for generating a force within the electric motor 203. The magnetic field may induce currents in a rotor that rotates under the force from the magnetic field. In another example, the magnetic field induces currents in the stator that supplies the force to permanent magnets in the rotor.

The electric motor 203 is mechanically linked to the compressor 201 and configured to rotate the impeller to force the quantity of air flowing toward the intake of the engine. A shaft may extend from the electric motor 203. The shaft may support the compressor 201 or rotate a portion of the compressor 203. The rotational energy of the electric motor shaft is transferred to the compressor 201. The compressor 201 transfers the energy to the air flowing to the intake of the engine. The shaft may be a common shaft that is common to the electric motor 203 and the compressor 203 as opposed to a flexible drive system. In some examples, a drive train may be included between the shaft of the electric motor 203 and the compressor 201.

The compressor 201 may include an impeller and a diffuser. The compressor 201 is configured to provide a quantity of air flowing toward an intake of the engine 205 through rotation of the impeller and the diffuser. The impeller is fixedly connected to a shaft of the electric motor 203. The impeller includes one or more vanes that are curved to translate the rotational force of the shaft to a flow of air. The flow of air may be continuous, and a velocity of the air may depend on the shapes and angles of the one or more vanes. The vanes of the impeller provide the air to the diffuser. The diffuser is downstream of the impeller with respect to the air flow, and the impeller is upstream of the diffuser with respect to the air flow. The diffuser may include one or more devices for gradually slowing or diffusing the flow of air. The diffuser may reduce the velocity of the flow of air. Example diffusers are wedge shaped, pipe shaped, or channel shaped.

The intercooler 204 is a charge air cooler configured to receive the quantity of air flowing toward the intake of the engine 205 and increase an air charge density of the quantity of air. The intercooler 204 may remove the heat caused by the compression of the air in the compressor 201.

The engine 205 includes an intake manifold that receive the air from the compressor 201, which may have passed through the intercooler 204. The engine 205 may include one or more cylinders, that perform a compression cycle of the engine 205 includes an intake stroke, a compression stroke, a power stroke, and an exhaust stroke. During the intake stroke, a piston moves from the top of the cylinder to the bottom of the cylinder. A fuel and air mixture is drawn into the cylinder. Next, during the compression stroke, the piston moves back to the top of the cylinder, compressing the fuel and air mixture against the cylinder head. Next, during the power stroke, the compressed fuel and air mixture is ignited by a spark plug, compression, or heat source. The piston is pushed back down toward the bottom of the cylinder by the pressure generated from combustion. Finally, during the exhaust stroke, the piston returns to the top of the cylinder to expel the spent or combusted fuel and air mixture through an exhaust valve. The engine 205 may include an exhaust manifold that receives the combusted air or exhaust. In one example, the exhaust leaving the engine 205 may travel through the exhaust manifold to the ambient environment without passing through any turbines (e.g., turbochargers). Thus, the exhaust manifold is an exhaust manifold directly connected to the ambient environment that does not include a turbine. Because the electric motor 203 provides power to the forced induction system, including compressor 201, a turbocharger driving by the exhaust of the engine 205 is not necessary. With no turbocharger creating high frequency noise, the silencer or muffler of the engine 205 may be omitted or tuned in a different manner because the turbocharger noise no longer must be attenuated by the muffler, which may reduce the size of the muffler.

The engine 205 may include an output shaft, such as a crankshaft, that is connected to the generator 207. The generator 207 includes a rotating part, rotor, and a stationary part stator. The armature, which can be part of the rotor or the stator, is the electric producing portion (e.g., coils of wire) for producing alternating current. The field produces a magnetic field that causes the alternating current to be produced with the rotor moves relative to the stator. The field may be in either the rotor or the stator and opposite to the armature. A separately excitable generator includes also includes an exciter generator for producing a field current for the magnetic field. The output of the generator 207 may be an alternating current with a frequency that is proportional to the speed of the engine 205. Alternatively, the generator 207 may be variable speed such that different speeds of the engine 207 may produce a constant output from the generator 207. The variable speed generator may include an AC to AC converter for maintaining a predetermined frequency in the output at different speeds of the engine 205.

Several alternatives are described for providing power to the electric motor 203. The electric motor 203 may be powered by any external source such as a utility source or a battery source. As shown in FIG. 2, the electric motor 203 may be powered from the output of the generator 207 through a conductive path 209.

In some examples, the electric motor 203 may be powered from the output of the generator 207 in a self-feeding system or generator to forced induction motor feedback loop. The output of the generator 207 and the electric motor 203 may be connected using a divider circuit (for example, voltage divider or a current divider) such that a ratio between the total output of the generator 207 and the amount of the output delivered to the electric motor 203 is defined based on the current divider. For example, resistor values for the divider circuit may be selected in order to provide the desired ratio of power to the electric motor.

The controller 200 may control the electric motor 203. The controller 200 may generate an instruction or command to turn on the electric motor 203, turn off the electric motor 203, or change the speed of the electric motor 203. The instruction or command may be a single bit or an analog signal that designates on or off. The instruction may include a speed for the electric motor 203. Different speeds may correspond to differ air flows from the compressor 201 and different operating speeds of the engine 205 and/or power outputs of the generator 207. Alternatively, the electric motor 203 may be a stepper motor, and the command from the controller 200 may include a pulse train for driving the step motor. The magnitude of one or more pulses may indicate a speed for the electric motor 203 and the width of the pulse may indicate a rotational distance for the electric motor 203, or vice versa.

The controller 200 may determine when to activate the electric motor 203 based on a variety of techniques. As described in more detail below, the controller 200 may receive sensor data related to the operation of the engine 205 and/or the generator 207. The controller 200 may analyze the sensor data to determine when the engine 205 or the generator 207 is in an operational range appropriate for additional air or density of air to be supplied to the engine 205. When the controller 200 determines that the engine 205 or the generator 207 is in an operational range, the controller 200 generates the command for the electric motor 203.

Figure 3:
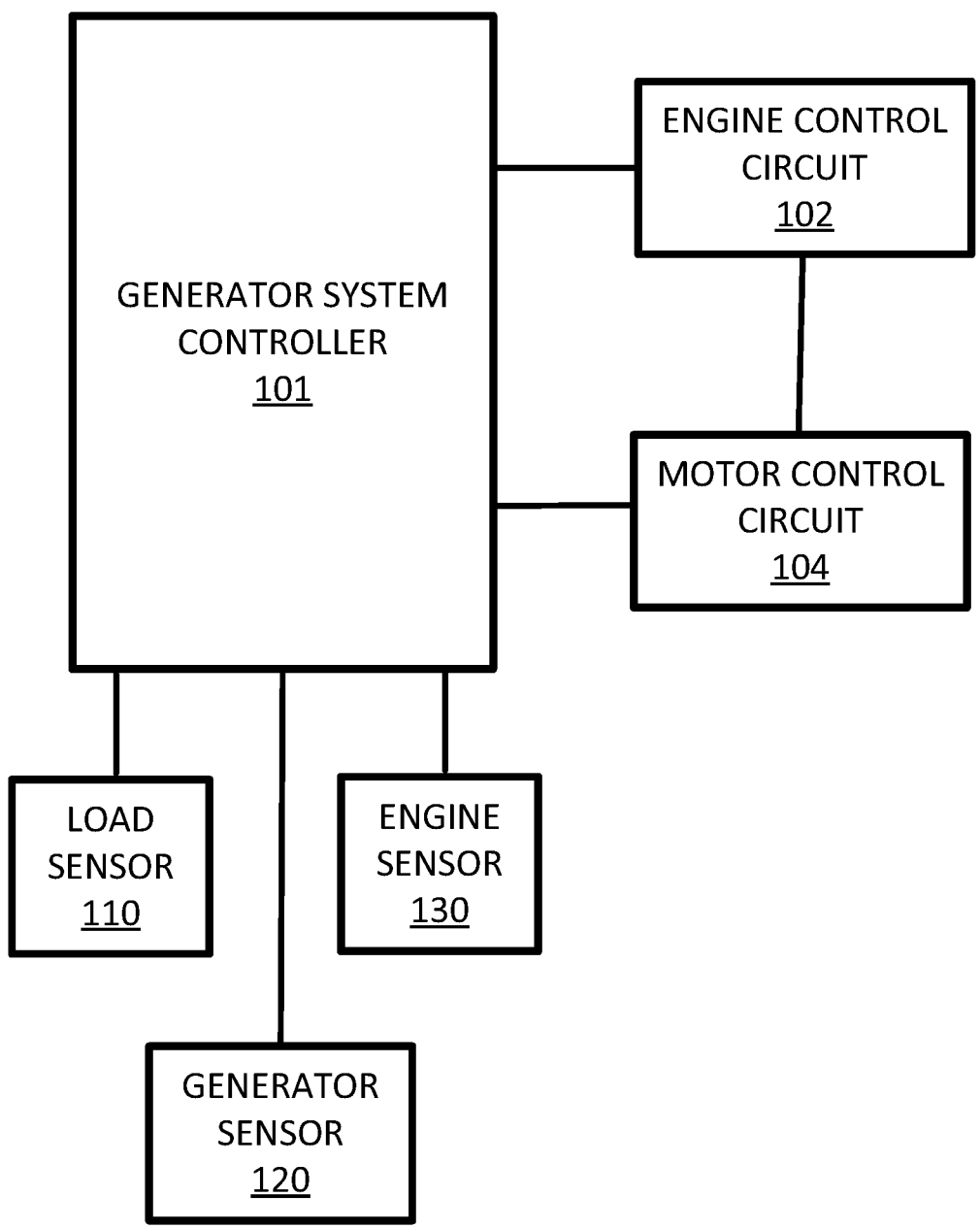
FIG. 3 illustrates an example control system for forced induction engine with an electric motor assisted compressor.

FIG. 3 illustrates an example control system for forced induction engine with an electric motor for a compressor. The system includes a generator system controller 101, an engine controller 102, and a motor control circuit 104, any of which may be combined into a single controller. The generator system controller 101 may be connected to one or any combination of a load sensor 110, a generator sensor 120, and an engine sensor 130. Additional, different or fewer components may be included.

The load sensor 110 may generate data indicative of a mechanical load on the engine 205 or an electrical load on the generator 207. The load sensor 110 may include a current sensor at an output of the generator 207. The output of the load sensor 110 may be proportional to the current drawn by the load. The load sensor 110 may alternatively indicate a high or low signal depending on whether the load is on or off. The load sensor 110 may determine an operating condition of the load. For example, the data indicative of the load may indicate whether the load is in a high power mode or lower power mode. The data indicative of the load may also indicate whether the load is a resistive load or a reactive load.

The generator sensor 120 may generate data indicative of an output of the generator 207. The generator sensor 120 may include an electrical parameter sensor (e.g., current sensor or voltage sensor) that measures an electrical output of the generator 207. The generator sensor 120 may measure the field current of the generator 207, which may be proportional to the output of the generator 207. The generator sensor 120 could alternatively measure a setting of the generator that is indicative of the output of the generator 207.

The engine sensor 130 may generate data indicative of a mechanical load of the engine 205. The mechanical load may be measured from the movement of a component such as a crankshaft, the gear box, transmission, or another component. The load sensor 110 may be a torque sensor, a deflection sensor, a dynamometer, a positional sensor, or a revolution sensor. The torque sensor may measure torque on the rotating shaft and utilize a non-contact power source for the torque sensor through a slip ring or a rotary transformer. The engine sensor 130 may be an input sensor such as a throttle or an accelerometer.

The generator system controller 101, an engine control circuit 102, and a motor control circuit 104 may be individual devices or combined into a single device such as controller 200. An integrated circuit for the engine control circuit 102 or the motor control circuit 104 may be used. In some examples, the generator system controller 101 may be omitted and the engine control circuit 102 and/or the motor control circuit 104 may be directly connected to one or more of the load sensor 110, the generator sensor 120, and the engine sensor 130. In other examples, the generator system controller 101 receives and analyzes the sensor data and generates an input signal for the engine control circuit 102 or the motor control circuit 104.

The engine control circuit 102 may determine whether the engine 205 is on or off. The engine control circuit 102 may initiate an ignition operation in response to a user input or an instruction from the generator system controller 101. The engine control circuit 102 may calculate the air to fuel ratio for the engine 205. The engine control circuit 102 may receive data from an oxygen sensor to determine whether the engine 205 is running to rich or too lean and adjust accordingly. The engine control circuit 102 may calculate the speed of the engine based on a throttle input. The engine control circuit 102 may generate an engine operational parameter that describes the operational characteristics of the engine 205. The engine operational parameter may include at least one data field indicative of whether the engine is running or not running, at least one data field describing the air to fuel ratio of the engine, and/or at least one data field describing a speed of the engine.

The motor control circuit 104 generate the command for the electric motor 203. The motor control circuit 104 may receive a message or signal describing the engine operation parameter from the engine control circuit 102 or the generator system controller 101. The motor control circuit 104 may generate the motor command depending on the operation of the engine 205. The motor control circuit 104 may activate the electric motor 203 when the engine 205 is running, when the speed of the engine 205 exceeds a predetermined speed, or when the air to fuel ratio of the engine 205 exceeds a predetermined level.

In embodiments when the electric motor 203 is activated based on the speed of the engine 205, the motor control circuit 104 compares a speed in the engine operational parameter to a predetermined speed. The speed and speed thresholds may be measured in revolutions per minute (RPM). Example threshold speeds for activating the electric motor 203 may include 1800 RPM, 2000 RPM, or 4000 RPM. The motor control circuit 104 may deactivate, or turn off the electric motor 203, as the speed of the engine 205 exceeds or falls below, respectively, the predetermined threshold. In some examples, a hysteresis may be applied such that the electric motor 203 is activated when the engine speed exceeds a first threshold and de-activated when the engine speed falls below a second threshold, such that the second threshold is less than the first threshold.

In another example, the engine 205 may be operable in multiple predetermined speeds. The predetermined speeds could include a set of speeds such as 3600 RPM, 3000 RPM, 2400 RPM and 1800 RPM. The motor control circuit 104 may activate the electric motor 203 at one or more of the set of speeds (e.g., 3600) but not activate the electric motor 203 at other speeds.

The engine 205 may require compressed air to reach certain engine speeds. For example, the motor control circuit 104 may activate the electric motor 203 in response to the throttle input. When the throttle input passes a predetermined level, the electric motor 203 is activated to increase the speed of the engine 205.

The engine 205 may require compressed air from the compressor 201 to reach a specific power output of the generator 207. The load sensor 110 may generate data indicative of the electrical load on the generator 207 and provide the data to the motor control circuit 104. The engine 205 may provide enough power to operate at loads of a particular level (e.g., 0 to 20 kW), and when the load demanded from the generator 207 exceeds the particular level, the motor control circuit 104 may operate the electric motor to supply the additional node.

Is some examples, the motor control circuit 104 may initiate operation of the electric motor 203 before the maximum naturally aspirated output of the engine 205. The electric motor 203 may require an amount of time to accelerate from a rest position (angular velocity of zero) to the operating speed (constant angular velocity). The motor control circuit 104 may initiate the electric motor 203 before the air flow from the compressor 201 is needed. A predetermined time period is defined as the time required to spool up the electric motor to accelerate up to speed so that extra power is available if needed by the load. In one example, the time period is measured based on operation of the electric motor 203 and the engine 205. Alternatively, rather than a time period, the acceleration of the electric motor 203 may correspond to a particular power level of the load. That is, the motor control circuit 104 may initiate the electric motor 203 at a preliminary level of power that is specific percentage or threshold amount less than the amount of power that requires the compressor 101.

In embodiments when the electric motor 103 is activated according to the air to fuel ratio, the motor control circuit 104 may compare an AFR value in the operational parameter to a predetermined level. When the AFR value falls below a threshold (the proportional amount of air in the mixture is too low), the motor control circuit 104 may activate the electric motor 103 to increase the amount of air and raise the AFR value.

The engine control circuit 102 may control air flow between the compressor 201 and the engine 205 through one or more valves. When the one or more valves are opened, some or all of the air flowing from the compressor 201 is released back into the ambient environment. The one or more valves may be partially opened to release some of the air to the ambient environment but advance some of the air flow to the engine 205. In some examples, the electric motor 103 runs at a constant speed at all times, or when the engine 205 is running, and the engine control circuit 102 regulates the flow of air entirely through the one or more valves that release pressure between the compressor and the engine 205.

The controller 200 may determine when to activate the electric motor 203 based on the type of fuel used by the engine 205. For example, liquefied petroleum (LP) or natural gas may be less power dense that conventional gasoline or diesel. Thus, the threshold for activated the electric motor or air valves may be adjusted so that air in forced into the intake manifold of the engine at lower RPMs when less power dense fuel is used. The type of fuel used by the engine 206 may be stored in memory by the controller 200 or received as a user setting.

Figure 4:
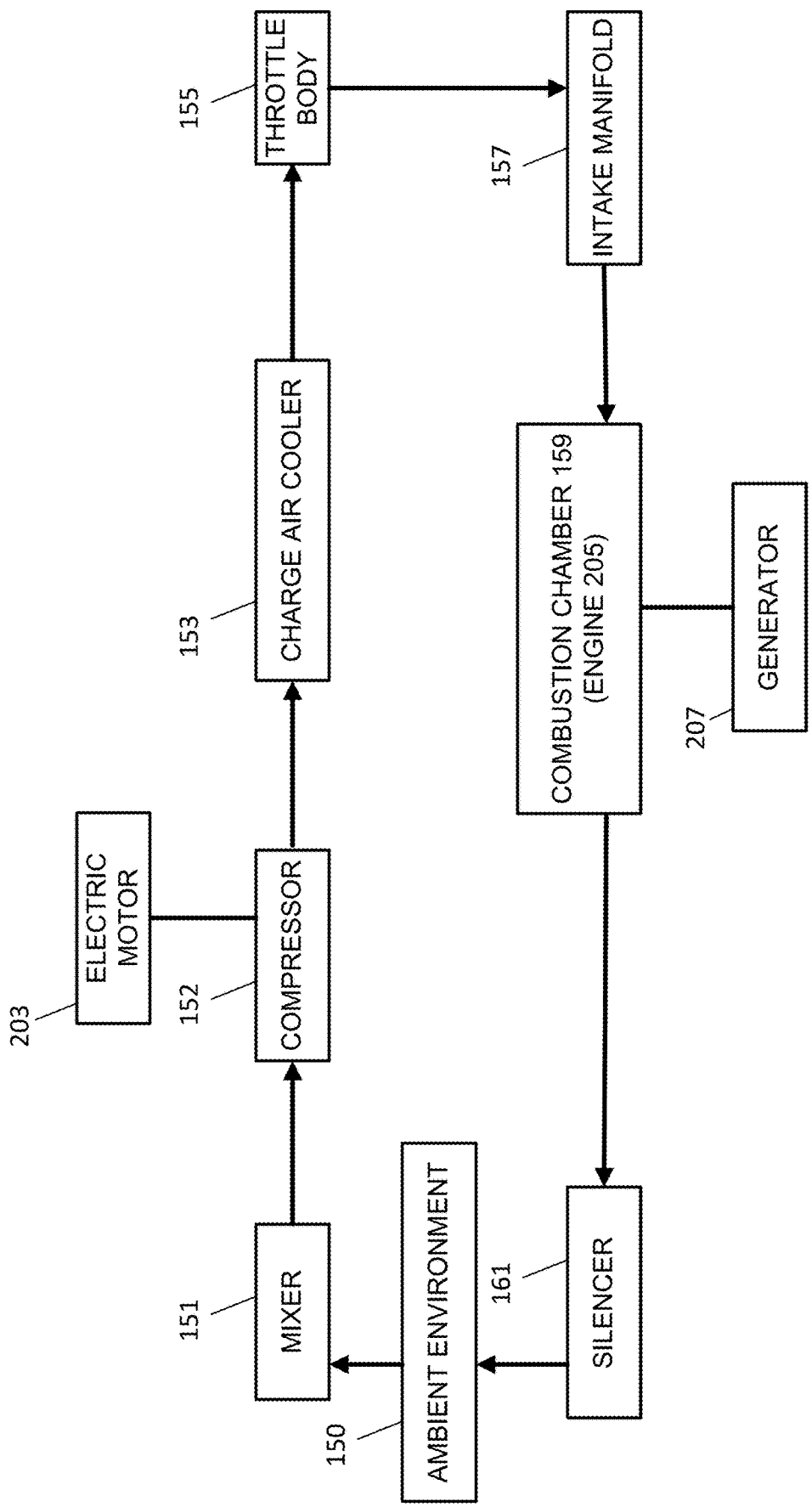
FIG. 4 illustrates an example block diagram for the forced induction engine with an electric motor assisted compressor being powered by a generator.

FIG. 4 illustrates an example block diagram for the forced induction engine with an electric motor for a compressor. The block diagram illustrates a cyclical sequence for the air cycle through the components of the forced induction engine. Additional, different, or fewer components may be included.

An ambient environment 150 represents a source of air for the engine. Properties of the ambient environment 150 may be detected by one or more sensors for temperature, pressure, or exhaust levels. The ambient environment 150 may be sealed away from the exhaust of the engine.

A mixer 151 mixes the air from the ambient environment 150 with gaseous fuel. A compressor 152 receives the flow of air and fuel from the mixer 151 and increases a pressure of the air. The compressor 152 is driven by an electric motor 203. The compressor 152 may include multiple vanes or passageway that focus the flow of air from the mixer 151 into an air flow having a predetermined velocity and/or predetermined velocity. The compressor 152 may increase the energy stored in of the air, which may increase the temperature of the air.

A charge air cooler 153 reduces the temperature of the air. In some examples, the charge air cooler 153 is omitted. The charge air cooler 153 may include a heat exchanger that transfers heat away from the air from the compressor 152. The heat exchanger may include a working fluid or gas, different that the air from the compressors 152 and divided by a conductive wall, that absorbs the heat from the air. Hot air is less dense than cool air. By decreasing the temperature of the air, the charge air cooler 153 increases the density of the air. Higher density air includes less oxygen per unit volume, which is less combustion with the fuel. Therefore, the charge air cooler 153 increases the amount of combustion and associated power produced by the engine and generator.

A throttle body 155 controls the amount of air flowing into the intake manifold 157. The throttle body 155 may include a butterfly valve or a throttle plate that rotates to regulate the air. The valve or plate may be controlled by a mechanical linkage to an accelerator pedal, stepper motor, or other throttle control. The valve or plate may be controlled by a motor, for example, by controller 200.

An intake manifold 157 receivers air from the throttle body 155 and delivers the air to one or more cylinders. The air intake manifold 157 may be shaped to distribute the air evenly among multiple cylinders. The intake manifold 157 may include one or more sensors, for example a pressure sensor or an AFR sensor. The intake manifold 157 may be formed from sheets of metal (e.g., cast iron or aluminum) or a composite material.

A combustion chamber 159 is a space in which the piston travels. The air from the intake manifold 157 is mixed with fuel in the combustion chamber 157. A spark from a spark module creates the combustion of the air and fuel mixture in the combustion chamber 159. Multiple combustion chambers 159 may be included to correspond with multiple cylinders. The intake manifold 157 may distribute the air from the compressor 152 across multiple combustion chambers 159.

A silencer 161 reduces the noise that is produced by the engine. The silence 161 may seal the combustion chamber 159 and intake manifold 157. The silencer 161 may include a muffler. The silencer 161 may include one or more chambers that may be sized according to one or more resonant frequencies of the sound of the engine such that different frequencies correspond to different dimensions for the chambers. The arrangement and/or dimensions of the chambers may be selected to create destructive interference among the sound waves. The air leaving the silencer 161 may be returned to the ambient environment 150. The air leaving the silencer 161 at the end of the cycle may be spaced apart from the air in the ambient environment 150 at the beginning of the cycle.

The air leaving the silencer 161 may be channeled to a specific area in the vicinity of the engine 205. The air leaving the silencer 161 is cooler than the hot portion (e.g., near the cylinders) of the engine 205. The air may be used to cool the hot portion of the engine 205. For example, the air may be directed to the cylinders and push away warmer air. The cylinders may be associated with cooling fins (e.g., find on the exterior of the cylinder jugs or frame). The air leaving the silencer 161 may travel across the fins to enhance the cooling of the cylinders or other hot portions of the engine 205.

Because the air from the exhaust is not used to drive the compressor 152, the total heat in the system is lower. The hot air is not used directly to drive the compressor 152, but in some examples the heat travels through the components before being transferred to the intake manifold 157. That is, rather than cycling hot exhaust through the system, cooler air may be drawn from the ambient environment.

Another benefit of the forced induction system with an electric motor for the driving compressor occurs is constant speed application. Consider a genset that operates at low RPM to coincide with a particular frequency (e.g., 50 Hz or 60 Hz). When high loads are applied at low RPM, a high torque may be required to operate the generator. The electric motor 203 increases the density of air in the intake of the engine 205, which increases the torque output of the engine 205.

Figure 5:
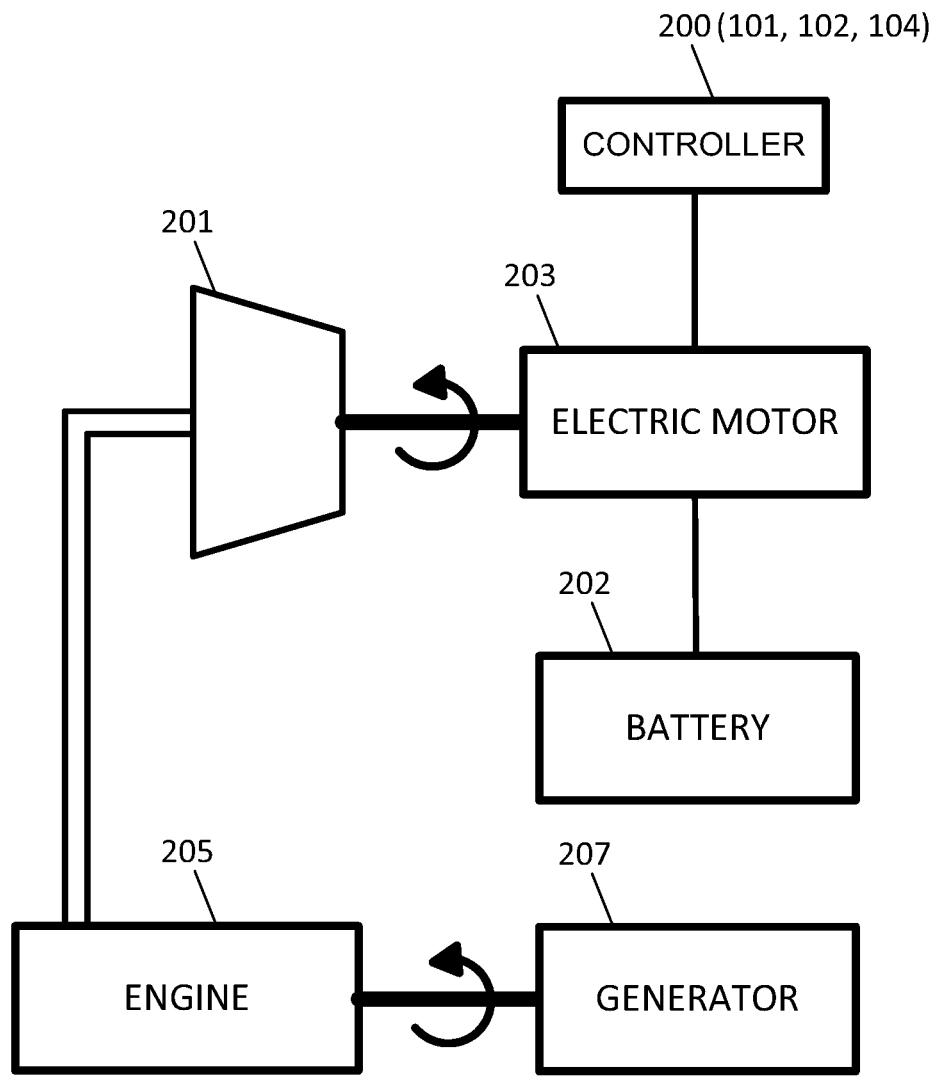
FIG. 5 illustrates an example electric motor for a compressor and powered by a standalone battery.

FIG. 5 illustrates an example electric motor for a compressor and powered by a standalone battery 202. Like reference numerals denote the same components as those in the previous drawings. Additional, different or fewer components may be included.

The battery 202 may be mounted to the electric motor 203 or to the engine 205. The battery 202 may be replaceable and include terminals for connection to the electric motor. The battery 202 may be rechargeable and include a connection to an external power source. The battery 202 may be integrated with a rectifier for converting an AC source to DC to charge the battery 202.

The battery 202 may be a standalone battery that is independent of the engine 205, which means that power for starting the engine 205 is not provided by the battery 202. The battery 202 may be independent of the field current of the generator 207, which means that power for generating the field current not provided by the battery 202. The battery 202 may be a standalone battery that is independent of the output of the generator 207, which means that the battery 202 is not charged by the output of the generator 207. The battery 202 may be a standalone battery that is independent of the controller 200, which means that power for operating the controller 200 is not provided by the battery 202.

Figure 6:
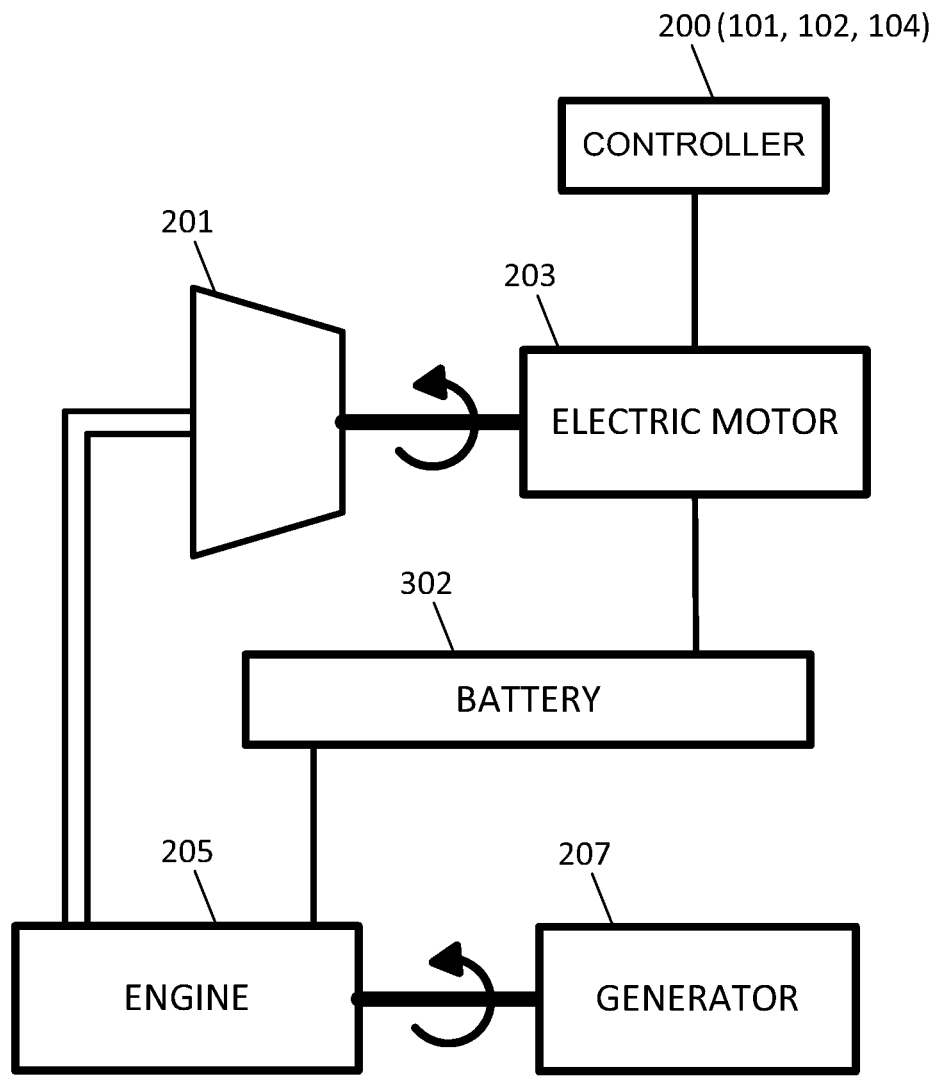
FIG. 6 illustrates an example electric motor for a compressor and powered by a starting battery for the generator.

FIG. 6 illustrates an example electric motor for a compressor and powered by a starting battery for the generator. Like reference numerals denote the same components as those in the previous drawings. Additional, different or fewer components may be included.

The battery 302 is common to at least one other device. The battery 302 may be common to the engine 205, the generator 207, or both the engine 205 and the generator 207. The battery 302 may be common to the engine 205 in the instance the battery 302 is also a starting battery for the engine 205. The battery 302 may be common to the generator 207 when the battery 302 supplies the field current to the generator 207. The battery 302 may be common to the generator 207 when the generator 207 charges and maintains the charge on the battery 302.

Figure 7:
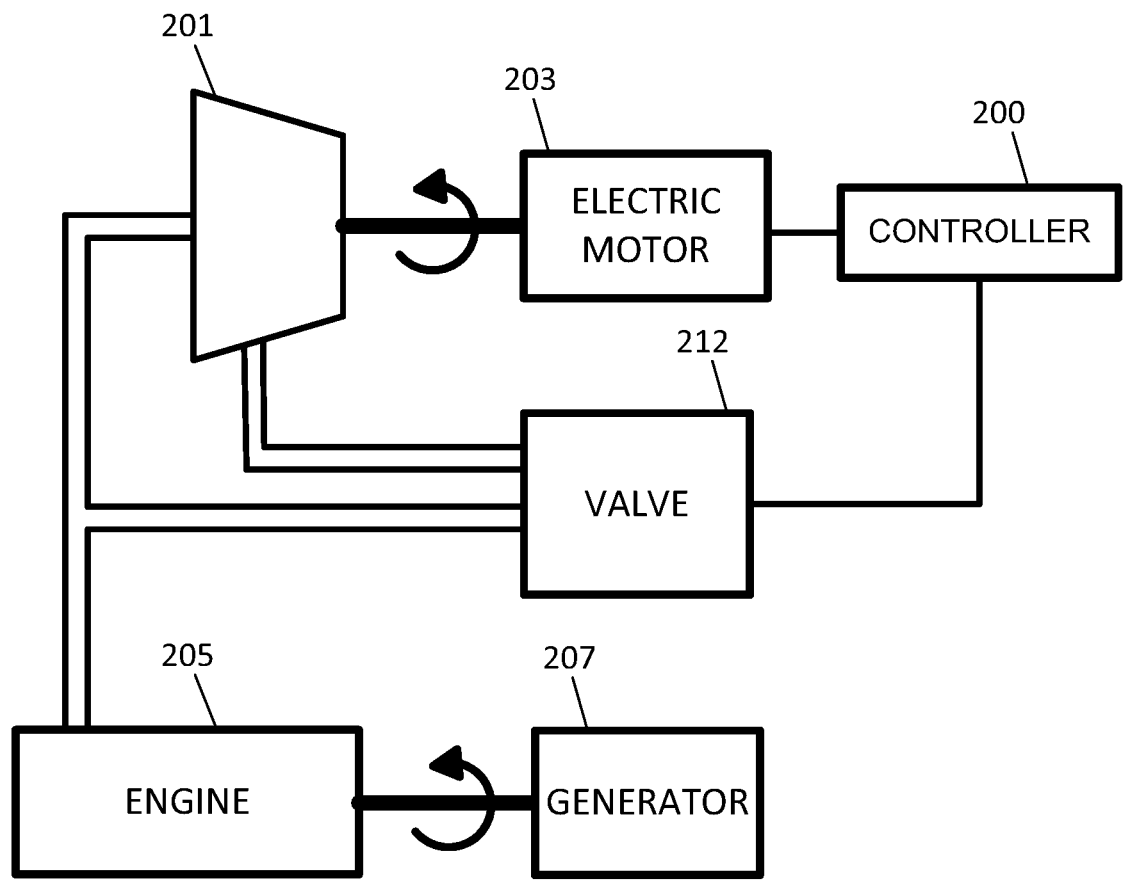
FIG. 7 illustrates an example release valve for the compressor.

FIG. 7 illustrates an example release valve 212 for the compressor 201. Like reference numerals denote the same components as those in the previous drawings. Additional, different or fewer components may be included.

The valve 212 is configured to regulate the quantity of air flowing toward the intake of the engine 205. The valve 212 may include a butterfly valve, a ball valve, a cylindrical valve, or another shape. The valve 212 may be operated by a solenoid, an actuating arm, or a motor. The controller 200 may generate a valve control signal to open and close the valve 212.

The controller 200 may analyze sensor data to generate the valve control signal for the valve 212 based on the sensor data. The valve 212 may be arranged in a default bypass arrangement (not shown in FIG. 7) in which the air from the compressor 201 is not transferred to the engine 205 unless the valve 212 is opened. The valve 212 may be arranged in a default forced induction arrangement (for example, shown in FIG. 7) in which the air from the compressor 201 is transferred to the engine 205 unless the valve 212 is opened to release pressure from the engine intake.

When the analysis of the sensor data indicates that more air should be applied from the compressor 201 to the engine 205, the valve 212 may be opened or closed depending on the arrangement. The excess air that is not supplied to the engine 205 may be siphoned off and blown back into the compressor 201. The excess air may be blown back into the intake path. At lower loads, this may include all of the air from the compressor 201, at moderate loads, this may include part of the air from the compressor 201, and at high loads, this may include none of the air from the compressor. As the load demand increases, more and more air is siphoned into the intake system.

The analysis of the sensor data may indicate the speed or acceleration of the engine 205. The valve 212 may be actuated based on the speed or acceleration of the engine 205. As the engine 205 reaches higher speeds, the controller 200 may instruct the valve 212 to release less air so that more air flows from the compressor 201 to the engine 205. The analysis of the sensor data may indicate the load on the generator 207. The valve 212 may be actuated based on the load of the generator 207. As a higher load is placed on the generator 207, the controller 212 may instruct the valve 212 to release less air so that more air flows from the compressor 201 to the engine 205.

The analysis of the sensor data may indicate the flow of air detected by a mass air flow sensor. The mass of the flow of air entering the intake of the engine 205. When the flow of the air is less than a predetermined mass, the controller 200 may instruct the valve 212 to allow more air to flow from the compressor 201 to the intake of the engine 205. In addition, the controller 200 may instruct a fuel injector to deliver the correct fuel mass or volume to the engine 202. Thus, the valve 212 may be selected to match a fuel mass or volume released from a fuel injector. The controller 200 may generate a valve setting for valve 212 and, in turn, a fuel injector setting for the fuel injector that corresponds to the flow of air released to the intake of the engine 205 based on the valve setting.

Figure 8:
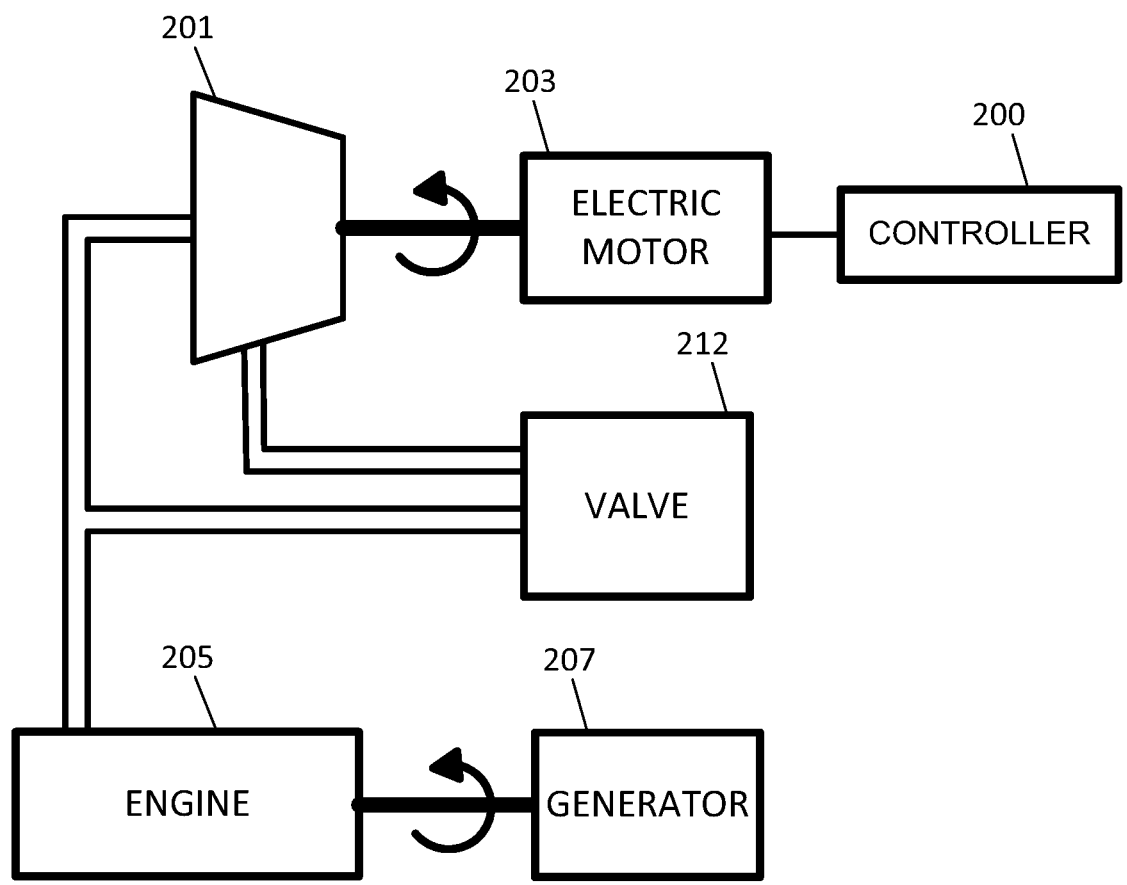
FIG. 8 illustrates another example release valve for the compressor.

FIG. 8 illustrates another example release valve 212 for the compressor 201. Like reference numerals denote the same components as those in the previous drawings. Additional, different or fewer components may be included.

The valve 212 may be configured to open under force of the quantity of air flowing toward the intake of the engine 205. For example, the valve 212 may be held close by a spring such that the flow pushes against the spring force to open the valve 212. The spring force may be selected to operate at a particular force (air pressure) in the flow of air. In this way the release valve may keep the pressure in the cavity between the compressor 201 and the engine 205 at a specified level or within a specified range.

Figure 9:
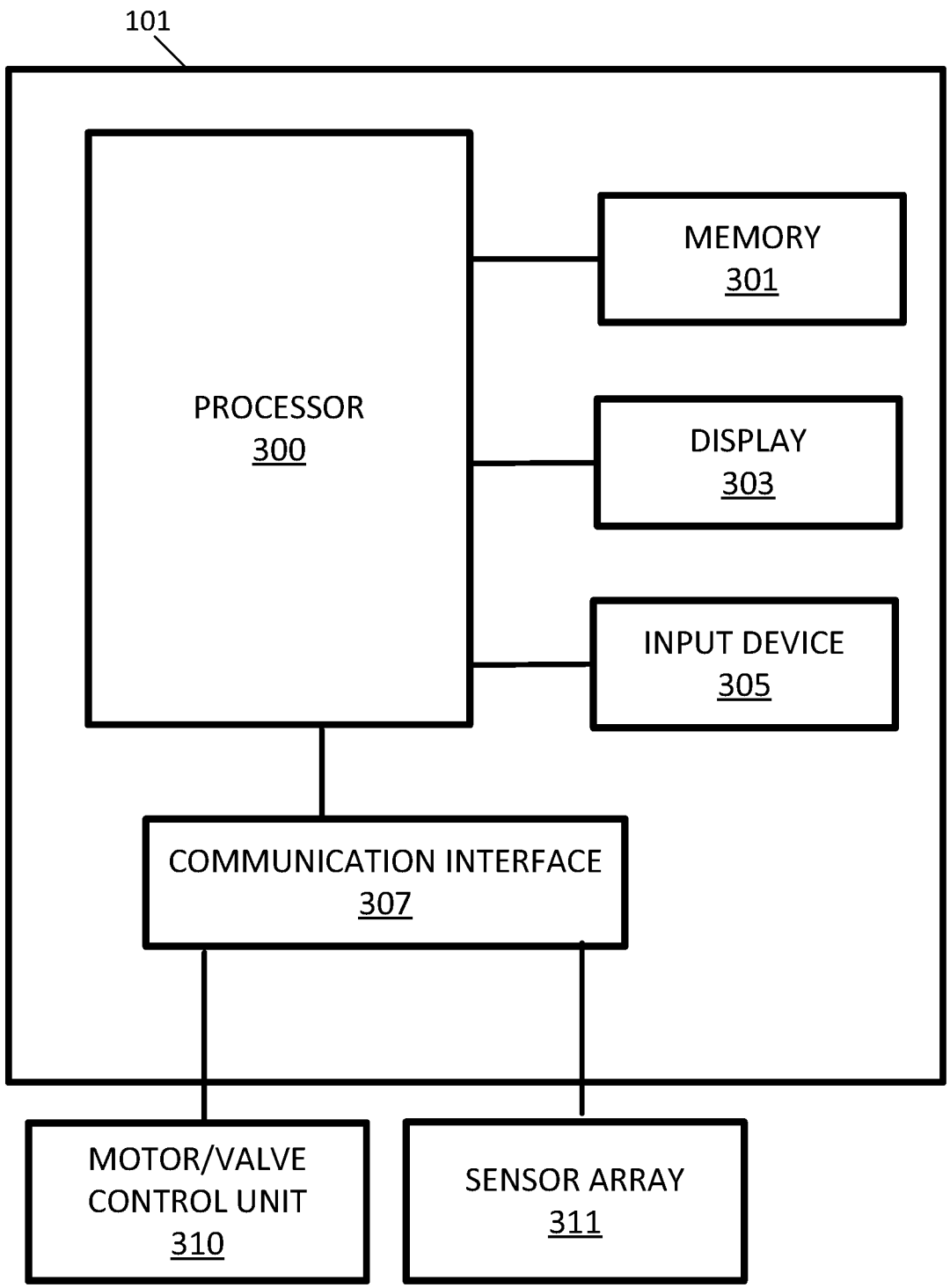
FIG. 9 illustrates an example controller for the examples of FIGS. 1-8.

FIG. 9 illustrates an example generator controller 101 of the system for forced induction with an electrically driven compressor. The generator controller 101 may include a processor 300, a memory 301, a display 303, an input device 305, and a communication interface 307. The generator controller 101 may be connected to a workstation or another external device (e.g., control panel) and/or a database. Optionally, the generator controller 101 may be coupled with a motor/valve control unit 310 and a sensor array 311. Additional, different, or fewer components may be included.

Figure 10:
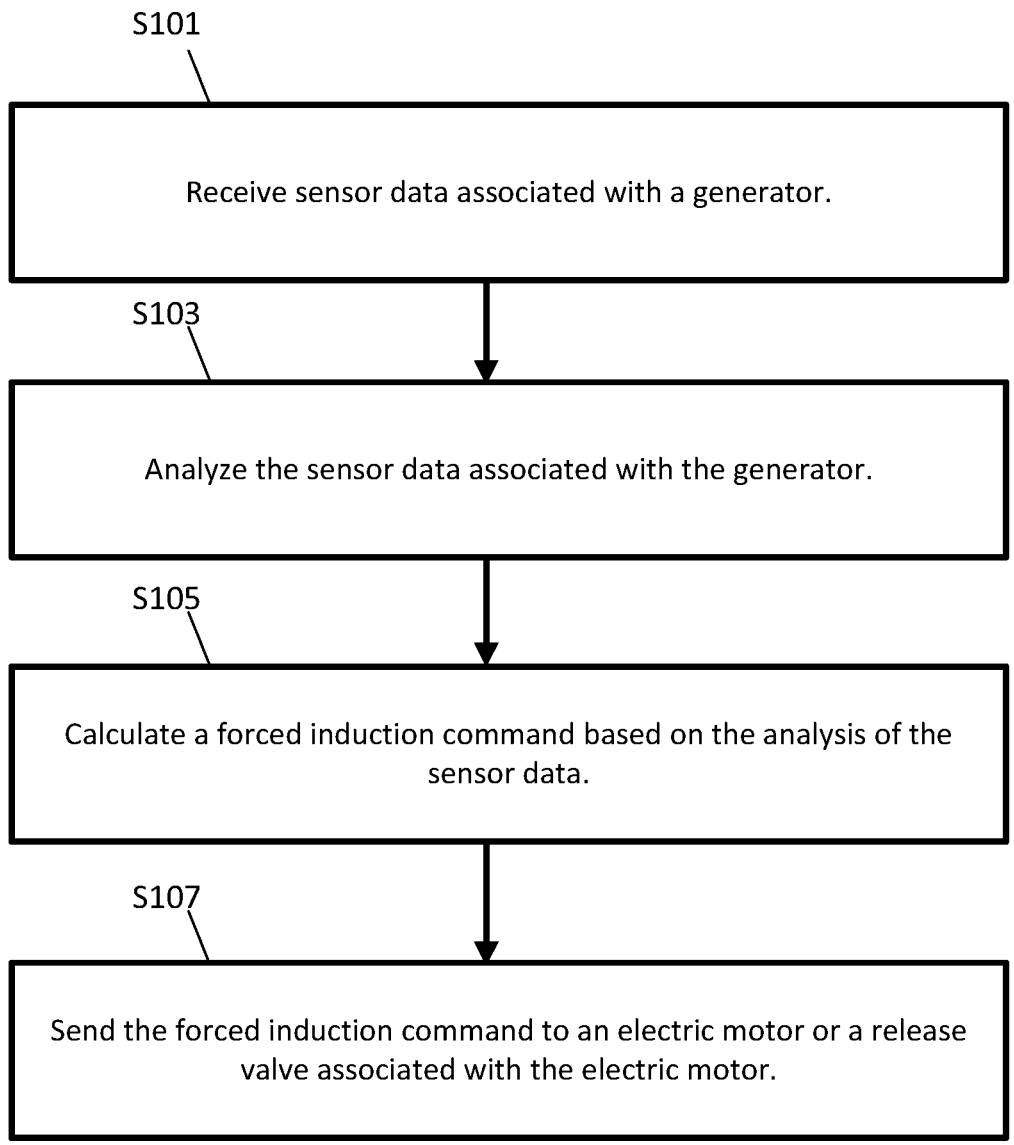
FIG. 10 illustrates an example flowchart for operation of the controller of FIG. 9.

FIG. 10 illustrates example flowchart for operation of the generator controller 101 of FIG. 9. The methods in FIG. 10 may, in some instances, be implemented as logic or software executable by generator controller 101. Additional, different, or fewer acts may be provided. The acts may be performed in the order shown or other orders. The acts may also be repeated.

At act S101, the generator controller 101, for example processor 300 or communication interface 307, receives sensor data associated with a generator. The sensing array 311 collects sensor measurements (e.g., power, current, voltage, speed, air flow, air to fuel ratio) from a sensor array 311 for the operation of the generator or connected generators. The sensor data may be indicative of an electrical load on a generator associated with the engine. The sensor data may be indicative of a speed of the engine.

At act S103, the generator controller 101, for example processor 300, analyzes the sensor data associated with the generator. The analysis may include one or more conditioning stages including filtering the data to remove outliers, sampling the data at a time interview, or averaging the data over time. The analysis of the data may compare the sensor data to a threshold. Thresholds may correspond to properties such as power, current, voltage, speed, air flow, air to fuel ratio, or other values described by the sensor data. Multiple properties may be analyzed by the generator controller 101. Different threshold may be used for different properties. In another example, the threshold may include an array of values that correspond to different properties. In other examples, manual inputs may be received by the input device 305.

At act S105, the generator controller 101 calculates a forced induction command based on the analysis of the sensor data. The forced induction command may include a command for the electric motor based on the sensor data or a command for the air valve based on the sensor data. The electric motor command may include an ON command, an OFF command, or speed for the electric motor. The command for the air valve may include an open command, a close command, or partial valve position level. The status of the forced induction command (for example, motor on, motor off, valve open, or valve off) may be displayed by the display 303 so the user can motor the forced induction status of the system.

The generator controller 101 may calculate a time period for the forced induction command. The time period may correspond an amount of time between when the electric motor or the valve receives the forced induction command and when the electric motor or the valve can implement the forced induction command. The time period may relate to a spooling time for the electric motor to start from rest and achieve an operating rotational speed. The time period may relate for an amount of time for a valve to be actuated from a closed position to an open position. In either case, the generator controller 101 may generate the forced induction command based on trends in the sensor data and the time period. For example, the generator controller 101 may determine a slope or rate of change in the sensor data and generate the forced induction command at a time before the sensor data is projected to reach the threshold level.

At act S107, the generator controller 101, for example the processor 300 or the communication interface 307, sends the forced induction command to the motor/valve control unit 310, which may operate as an electric motor control unit, a valve control unit, or a combined motor and valve control unit. The electric motor is mechanically linked to drive a compressor including an impeller and rotate the impeller to force the movement of air. The compressor to provides a quantity of air flowing toward an intake of an engine through rotation of the impeller.

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device, such as a secure digital (SD) memory card.

The input device 305 may include a control panel coupled to or integrated with one of the generators. The input device 305 may be one or more buttons, keypad, keyboard, mouse, touch pad, voice recognition circuit, or other device or component for inputting data to generator controller 101. The input device 305 and the display 303 may be combined as a touch screen. The input device 305 may be an interface connected to a mobile device such as a smart phone, computer, or tablet for sending user settings to the generator controller 101.

In addition to ingress ports and egress ports, the communication interface 307 may include any operable connection. An operable connection may be one in which signals, physical communications, and/or logical communications may be sent and/or received. An operable connection may include a physical interface, an electrical interface, and/or a data interface.

The communication interface 307 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 302) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. An apparatus having an engine including an intake passage for supplying air to the engine, and an exhaust passage for discharging exhaust gas from the engine, the apparatus comprising:

a compressor including an impeller, the compressor configured to provide a quantity of air flowing toward an intake manifold of an engine through rotation of the impeller;

an electric motor mechanically linked to the compressor and configured to rotate the impeller to force the quantity of air flowing toward the intake manifold of the engine;

a charge air cooler configured to receive the quantity of air flowing toward the intake manifold of the engine and increase an air charge density of the quantity of air; and a controller including a memory storing executable instructions to analyze sensor data to determine at least one of the engine and a generator associated with the engine being in an operating condition; and to generate a command for the electric motor based on the sensor data during the operating condition of the at least one of the engine and the generator associated with the engine;

wherein the sensor data includes at least data indicative of an electrical load on the generator associated with the engine.

2. The apparatus of claim 1, wherein the exhaust passage is directly connected to an ambient environment, wherein the exhaust passage does not include a turbine.

3. The apparatus of claim 2, wherein the exhaust passage is diffused internally in a compartment including the engine.

4. The apparatus of claim 1, further comprising:
an air valve configured to regulate the quantity of air flowing toward the intake manifold of the engine.

5. The apparatus of claim 4, wherein the controller further comprises executable instructions to analyze sensor data and generate a command for controlling the air valve based on the sensor data.

6. The apparatus of claim 4, wherein the air valve is opened under force of the quantity of air flowing toward the intake manifold of the engine.

7. The apparatus of claim 1, wherein the controller further comprises executable instructions to determine a spooling time for the electric motor and generate the command for the electric motor based on the spooling time.

8. An apparatus having an engine including an intake passage for supplying air to the engine, and an exhaust passage for discharging exhaust gas from the engine, the apparatus comprising:
a compressor including an impeller, the compressor configured to provide a quantity of air flowing toward an intake manifold of an engine through rotation of the impeller;
an electric motor mechanically linked to the compressor and configured to rotate the impeller to force the quantity of air flowing toward the intake manifold of the engine;
a charge air cooler configured to receive the quantity of air flowing toward the intake manifold of the engine and increase an air charge density of the quantity of air; and
a controller including a memory storing executable instructions
to analyze sensor data to determine at least one of the engine and a generator associated with the engine being in an operating condition;
to generate a command for the electric motor based on the sensor data during the operating condition of the at least one of the engine and the generator associated with the engine; and
to identify at least one of a group comprising a fuel type, a fuel amount, and an air to fuel ratio provided to the engine and generate the command for the electric motor based on the at least one of the fuel type, the fuel amount, and the air to fuel ratio being provided to the engine.

9. An apparatus having an engine including an intake passage for supplying air to the engine and an exhaust passage for discharging exhaust gas from the engine, the apparatus comprising:
a compressor including an impeller, the compressor configured to provide a quantity of air flowing toward an intake manifold of an engine through rotation of the impeller;
an electric motor mechanically linked to the compressor and configured to rotate the impeller to force the quantity of air flowing toward the intake manifold of the engine;
an air valve configured to regulate the quantity of air flowing toward the intake manifold of the engine; and
a controller including a memory storing executable instructions
to analyze sensor data to determine at least one of the engine and a generator associated with the engine being in an operating condition; and
to generate a command for the electric motor based on the sensor data during the operating condition of at least one of the engine and the generator associated with the engine;
wherein the sensor data includes data indicative of an electrical load on the generator associated with the engine.

10. The apparatus of claim 9, wherein the air valve is activated in response to a pressure associated with the compressor.

11. The apparatus of claim 9, wherein the controller activates the air valve and the electric motor in response to operation of the engine.

12. The apparatus of claim 9, further comprising:
a charge air cooler configured to receive the quantity of air flowing toward the intake manifold of the engine and increase an air charge density of the quantity of air.

13. The apparatus of claim 9,
wherein the exhaust passage for expelling the exhaust gas from the engine, wherein the quantity of air provided by the compressor does not include the exhaust gas expelled by the exhaust passage.

14. The apparatus of claim 9, wherein the electric motor is coupled to a generator associated with the engine.

\* \* \* \* \*